Patented Sept. 15, 1942

2,295,644

UNITED STATES PATENT OFFICE 2,295,644

MANUFACTURE OF KETENE, ACETIC ANHYDRIDE, AND HOMOLOGUES THEREOF

Leonard Fallows and Eric Vernon Mellers, Spondon, near Derby, England, assignors to Celanese Corporation of America, a corporation of Delaware No Drawing. Application December 20, 1938, Serial No. 246,846. In Great Britain January 20, 1938

2 Claims. (Cl. 260—547)

This invention relates to improvements in the manufacture of ketene, acetic anhydride and homologues thereof by the thermal dehydration of the corresponding acids.

The general method of manufacturing ketene or acetic anhydride directly from acetic acid is to subject the acetic acid to thermal decomposition or dehydration, usually in the presence of suitable catalysts. While dehydration takes place over a wide range of temperature, the most useful range is generally 500–1000° C. and especially 600–900° C., though of course the optimum temperature naturally depends upon the particular conditions employed and notably the particular catalyst and the pressure or partial pressure of the acetic acid. U. S. Patent No. 1,735,962 described catalysing the reaction by means of a phosphoric acid and indicates that the process may be carried out under reduced pressure or at ordinary pressure. Further, U. S. Patent No. 1,883,353 shows that it is advantageous to carry out the reaction in the presence of non-metallic bases, and in particular ammonia and the organic nitrogen bases, for example pyridine, piperidine, aniline, alkyl anilines, toluidines and the like. Further, in this specification it is indicated that while the reaction may be carried out at pressures higher than atmospheric, it is preferable to employ atmospheric pressure or reduced pressure. The amount of the ammonia, pyridine or other base may, for example, be of the order of 1% based on the weight of the acetic acid subjected to thermal decomposition, or may be less than this. In the said specification it is indicated that the bases may be used in conjunction with the known catalysts for promoting the thermal decomposition of the acetic acid, and in particular it is stated that as catalysts there may be used the phosphates of the bases. Obviously, instead of using phosphoric acid itself combined with the base, substances yielding phosphoric acid under the reaction conditions, e. g. triethyl phosphate, tricresyl phosphate or other esters of phosphoric acid, may be used together with the base.

The present invention is concerned with the thermal dehydration of acetic acid by processes of the type referred to in which phosphoric acid, alone or together with ammonia or a volatile organic nitrogen base, is employed as catalyst. According to the invention it has been found that this type of process can be improved by carrying out the thermal dehydration in presence of zinc oxide or cadmium oxide. Zinc oxide has been found to be of particular value in the process of the invention, and the invention will be described particularly with reference thereto.

The zinc oxide may be introduced into the reaction chamber as such or in the form of a compound which is changed into the oxide under the reaction conditions. For instance a carrier, for example pumice granules or copper in a form having a high surface:weight ratio, may be impregnated or coated with a compound capable of yielding zinc oxide when heated, e. g. zinc acetate, nitrate, carbonate or hydroxide, and the product heated to decompose the zinc compound to oxide, and then charged into the tube or other apparatus employed for the thermal dehydration of the acetic acid. In a similar method of carrying out the process the carrier may be coated with zinc acetate, nitrate, carbonate or hydroxide and charged into the reaction vessel in this form; the zinc compound will then be decomposed to the oxide as the reaction vessel is heated to the reaction temperature.

According to an important form of the invention the zinc oxide, or compound capable of yielding zinc oxide, is introduced into the reaction zone dispersed throughout the body of acid vapor. This may be done by introducing into the stream of acetic acid vapor entering the reaction zone a solution or suspension of a suitable zinc compound, for example zinc acetate, nitrate, carbonate or hydroxide, or the oxide itself. Alternatively, a small proportion of zinc oxide may be added to the acetic acid which is to be subjected to thermal dehydration before this acid is vaporised, so that when the acid is vaporised it carries with it finely divided zinc acetate or oxide. Quite a small proportion of zinc compound is all that is necessary for assisting the thermal dehydration, for instance a quantity equal to 1% of the weight of the acetic acid being subjected to thermal dehydration, and much smaller quantities than this, for example .5% or less, e. g. down to about .1%, produce a noticeable effect in the process. On the other hand, somewhat larger quantities may be employed if desired, for instance 2 or 3% of the weight of the acetic acid being subjected to thermal dehydration.

Where a solution or suspension of zinc oxide or a suitable zinc compound is introduced into the stream of acetic acid vapor entering the reaction zone, this solution is preferably so concentrated that the quantity to be introduced is quite small in relation to the quantity of acid subjected to thermal dehydration, representing say about 5–10% of the weight of the acid. The solution or suspension of the zinc compound may also contain the phosphorus-containing catalyst, for instance ammonium phosphate. Alternatively, separate solutions or suspensions of the zinc compound and of the phosphorus compound may be introduced into the acid vapor. The solution or suspension of the phosphorus compound, like that of the zinc compound, should be so concentrated that the quantity to be introduced is quite small, representing about 5–10% of the weight of the acid, and is preferably a solution in water or aqueous acetic acid.

Where bases are to be employed in the process, the quantity of base may, as previously indicated, be of the order of 1% of the weight of the acetic acid subjected to decomposition or may be less, e. g. 0.2 to 0.5%. Similarly the proportion of phosphoric acid may be quite small and may be equivalent to the amount of base used. It is to be understood that, instead of phosphoric acid, substances yielding phosphoric acid, e. g. esters of phosphoric acid, may be employed, and instead of the phosphate of a base, the base together with a substance yielding phosphoric acid may be employed.

Preferably in carrying out the process of the invention the acetic acid is preheated before it is introduced into the reaction zone; advantageously it may be heated to a temperature within 20°–70° C. of the temperature at which the thermal dehydration is to be effected, but, if desired, the vapor may be heated to a temperature between 70° and 100° C. below that to be used for the thermal dehydration, or on the other hand, it may be heated right up to this temperature. As previously indicated, temperatures of 600°–900° C. are especially suitable for the thermal dehydration; very good results are obtained at temperatures of from 650°–750° C.

The reaction is best carried out at a pressure not greatly exceeding atmospheric. Indeed, pressures less than atmospheric are of advantage, not only when acetic anhydride is desired as the main or sole product, but to an even greater degree when ketene is so desired.

The acetic anhydride and/or ketene may be recovered from the reaction products in any suitable manner. For example, the reaction products may be cooled so as to condense the whole of the acetic anhydride, water and unchanged acetic acid, ketene being allowed to pass on, or the reaction products may be subjected to a fractional condensation designed to separate the acetic anhydride from the water, unchanged acid and ketene. In such a process it is of advantage to employ liquids, such as benzene, toluene, xylene, chlorobenzene, chloroform and the like, which form an azeotropic mixture with the water.

While the invention has been particularly described above in relation to the thermal dehydration of acetic acid, it may be applied to the thermal dehydration of other aliphatic acids, for example propionic acid, butyric acid and the like. Furthermore, the invention is not limited to carrying out the thermal dehydration with the aid of a zinc compound; thus the zinc compound may be replaced wholly or partly by cadmium oxide or a compound yielding cadmium oxide under the conditions of the thermal dehydration.

The following examples illustrate without in any way limiting the invention:

*Example 1*

Zinc nitrate is dissolved in water, and the solution evaporated to dryness in the presence of small pieces of pumice; during the evaporation the solution is constantly stirred. When the water has all been driven off the pumice is more strongly heated so that zinc oxide is produced. The pumice supporting the zinc oxide is placed in a reaction tube, which is heated to 690° C.

Acetic acid is vaporised and the vapors preheated to 620°–630° C.; into the preheated vapors there is injected about 10% of an acetic acid solution containing 2% of triethyl phosphate and 2% of pyridine. The vapors leaving the reaction zone are rapidly cooled to condense the anhydride formed and part of the unchanged acetic acid, leaving the water and the remainder of the unchanged actic acid in the vapor phase.

*Example 2*

Acetic acid vapor is preheated to 640° C. and then passed through an empty reaction tube heated to 700° C. At or near the point where the acid vapors enter the reaction tube, there is injected into the vapors 10% of the acetic acid catalyst solution used in Example 1, to which however 15% of zinc acetate has been added. The acetic anhydride formed is separated by fractional condensation in the presence of sufficient benzene to form an azeotropic mixture with all the water vapor present.

Having described our invention, what we desire to secure by Letters Patent is:

1. In a process for the manufacture of ketene and acid anhydride by thermal dehydration of acetic acid vapor at a temperature of 500 to 1,000° C. and in the presence of phosphoric acid as catalyst, the step of passing said acetic acid vapor and phosphoric acid over a substantially inert carrier having deposited thereon a substance selected from the group consisting of zinc oxide, cadmium oxide and compounds yielding these oxides under the conditions of the thermal dehydration.

2. In a process for the manufacture of ketene and acid anhydride by thermal dehydration of acetic acid vapor at a temperature of 600 to 900° C., and in the presence of phosphoric acid as catalyst, the step of passing said acetic acid vapor and phosphoric acid over a substantially inert carrier having deposited thereon a substance selected from the group consisting of zinc oxide, cadmium oxide and compounds yielding these oxides under the conditions of the thermal dehydration in a quantity up to substantially 1% by weight of the acetic acid vapor.

LEONARD FALLOWS.
ERIC VERNON MELLERS.